United States Patent [19]

Rowe

[11] Patent Number: 4,488,040
[45] Date of Patent: Dec. 11, 1984

[54] FIBER OPTIC SENSOR

[75] Inventor: Donald H. Rowe, Portola Valley, Calif.

[73] Assignee: GTE Products Corporation, Stamford, Conn.

[21] Appl. No.: 442,984

[22] Filed: Nov. 19, 1982

[51] Int. Cl.$^3$ .................... G02B 5/14; G02B 5/172
[52] U.S. Cl. .................. 250/227; 350/96.23; 350/96.29
[58] Field of Search .............. 250/227, 231 R; 350/96.23, 96.29, 96.30

[56] References Cited

U.S. PATENT DOCUMENTS

| | | | |
|---|---|---|---|
| 4,129,356 | 12/1978 | Oestreich | 350/96.23 |
| 4,294,513 | 10/1981 | Nelson et al. | 350/96.29 |
| 4,405,198 | 9/1983 | Taylor | 350/96.29 |
| 4,421,979 | 12/1983 | Asawa et al. | 250/227 |
| 4,443,700 | 4/1984 | Macedo et al. | 250/227 |

OTHER PUBLICATIONS

Fields et al., *Applied Optics*, vol. 19, No. 19, Oct. 1980, "Fiber Microbend Acoustic Sensor," pp. 3265–3267.
Giallorenzi et al., *IEEE J. of Quantum Electronics*, vol. QE-18, No. 4, Apr. 1982, "Optical Fiber Sensor Technology," pp. 626–665.
Alekseer et al., *Sov. Tech. Phys. Lett.*, 5(7), Jul. 1979, "Polarization Modulation of the Radiation . . . ," pp. 367–368.
Bykov et al., *Sov. Tech. Phys. Lett.*, 6(1), Jan. 1981, "Polarization Modulation of Light . . . ," pp. 24–25.
Hocker, *Applied Optics*, vol. 18, No. 21, Nov. 1979, "Fiber Optic Acoustic Sensors with Composite Structure: an Analysis," pp. 3679–3683.

*Primary Examiner*—William L. Sikes
*Assistant Examiner*—Frank González
*Attorney, Agent, or Firm*—John F. Lawler

[57] ABSTRACT

A fiber optic sensor useful, for example, in intrusion detection systems for sensing seismic or pressure disturbances produced by an intruder, comprises a cable having an optical fiber core for transmitting the output of a laser, a hard preferably electrically nonconductive strand wound helically on and coextensive with the fiber, and a compliant tubular sleeve over the fiber and strand. The coils of the strand are axially spaced apart and circumferentially engage the fiber. The sleeve fits snugly over the strand and fiber and transmits through the strand coils to the fiber forces resulting from disturbances to be detected, subjecting the fiber to bending stresses. With cable connected at one end to the laser output, the polarization of light transmitted by the fiber is changed by the induced stresses and is detected at the other end of the cable to indicate the occurrence of the disturbance.

3 Claims, 5 Drawing Figures

FIBER OPTIC SENSOR

BACKGROUND OF THE INVENTION

This invention relates to an improved fiber optic line sensor.

A fiber optic line sensor system generally consists of an optical fiber connected at one end to the output of a laser and at the other end to an optical detector. Seismic and like vibrations incident on the fiber modulate the light transmitted by the fiber and the detector is responsive to such modulation. Sensitivity of the fiber sensor to such forces may be enhanced by short radius (sharp) bending of the fiber about a small radius proportionally to the applied force, called microbending, as reported in articles entitled "Optical Fiber Sensor Technology" by T. G. Giallorenzi et al, IEEE Journal of a Quantum Electronics, QE-18, No. 4 pages 626–665, April 1982, and "Fiber Microbend Acoustic Sensor" by J. N. Fields et al, Applied Optics, Vol. 19, No. 19, pages 3265–3267, October 1980. In the latter publication, the active fiber is disposed between two ridged plates, one of which is moved relative to the other under the influence of the acoustic field. Such sensor structure is complex and costly to assemble and calibrate and has limited application because of its configuration. This invention is directed to a microbend line sensor which overcomes these disadvantages.

OBJECT AND SUMMARY OF THE INVENTION

A general object of the invention is the provision of a highly sensitive fiber optic cable that is responsive to seismic and like vibrations and can be produced at low cost.

A further object is the provision of such a cable that is flexible and relatively easy to install.

Still another object is the provision of such cable that has unidirectional or omnidirectional sensitivity.

These and other objects are achieved with a fiber optic cable having a hard strand tightly wound around an optical fiber and snugly enclosed in a compliant sleeve having either a circular or oblong cross-section to provide omnidirectional or directional sensitivity, respectively. The coils of the strand are axially spaced and apply transverse forces to the fiber so as to induce microbending stresses therein which modulate light transmitted within the fiber.

DESCRIPTION OF PREFERRED EMBODIMENTS

Figure 1:
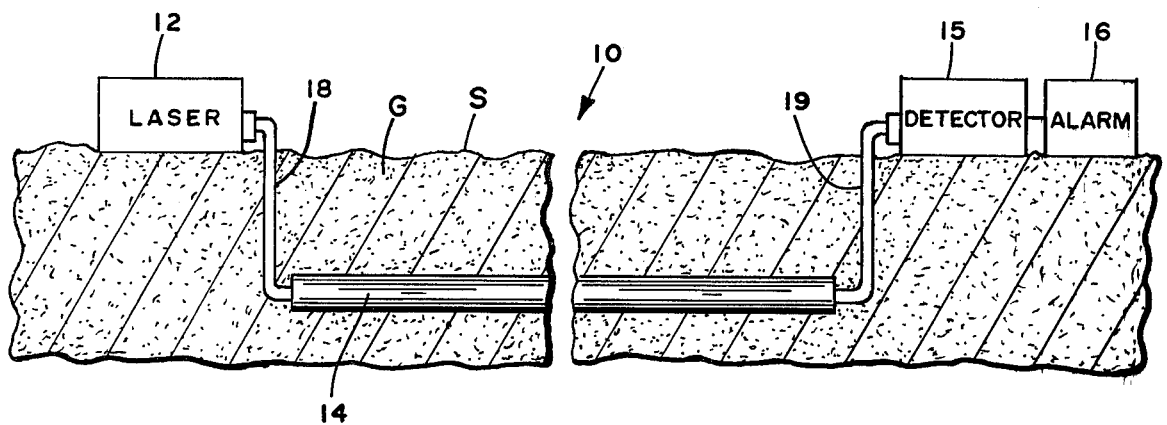
FIG. 1 is a schematic elevation of a buried line intrusion detection system utilizing a fiber optic cable embodying this invention.
Figure 2:
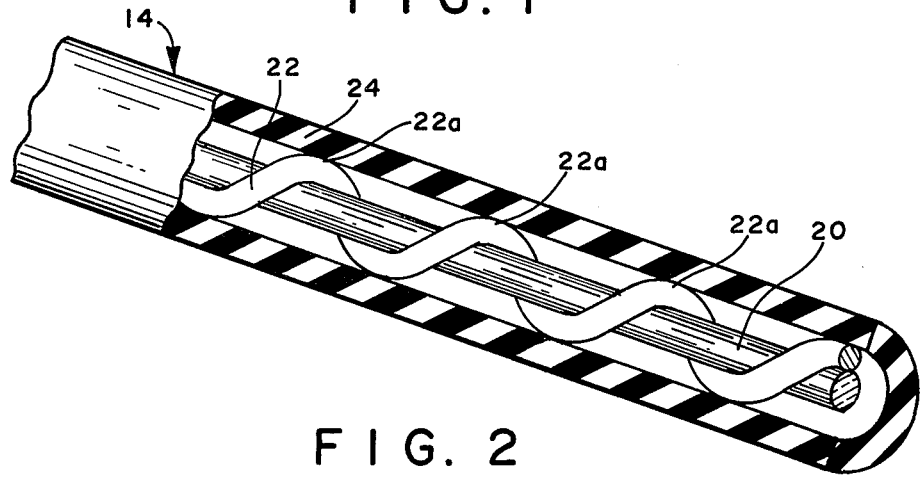
FIG. 2 is a perspective view partly in section of a cable embodying this invention.

Referring now to the drawings, one embodiment of the invention given by way of example is a subterranean intrusion detection system 10, see FIG. 1, comprising a laser 12, a cable 14 buried under the ground G, an optical detector 15 and alarm apparatus 16. Laser 12 may be a CW injection type with a 2 milliwatt 820 nanometer output connected by an optical fiber link 18 to the input end of cable 14, the opposite or output end of which is connected by another optical fiber link 19 to detector 15. In one embodiment, the output of laser 12 is linearly polarized and detector 15 measures the shift in polarization of light from cable 14 as described in the Applied Optics article referenced above. Cable 14 is buried below the surface S of ground G at a depth of about 12 inches and is exposed to vibrations and pressure waves transmitted from ground surface S by a walking person, for example, through the ground to cable 14 which induces a change in optical transmission characteristics of the fiber. More specifically, the footsteps produce a change in characteristics such as polarization, of coherent light passing through the cable which is detected by detector 15 to actuate alarm apparatus 16.

Cable 14 comprises an elongated optical fiber 20 of glass, plastic or other transparent material, a strand 22 a flexible relatively hard preferably electrically nonconductive material made of a synthetic substance such as "KEVLAR," (aramid fiber) made by E. I. Dupont de Nemours and Company, wound in the form of a helix around fiber 20, and a sleeve 24 of compliant material made of a synthetic resin such as "TEFLON" (tetrafluorethylene fluorcarbon resins) or nylon disposed over and in tight contact with strand 22. The hardness of strand 22 is preferably equal to or greater than the hardness of fiber 20. Coils 22a of strand 22 are axially spaced apart as shown and transmit forces resulting from intruder generated vibrations from sleeve 24 to axially spaced points on fiber 20.

Alternatively, the strand and fiber of the cable may take the form of a twisted pair of substantially identical optical fibers. Such fibers may be used as redundant coextensive sensors providing a spare fiber in the same cable.

Figure 3:
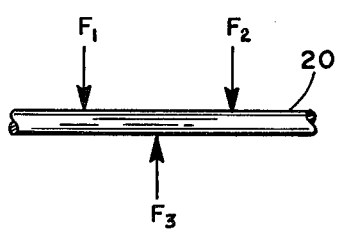
FIG. 3 is a schematic view showing bending forces applied to the optical fiber in accordance with this invention.

Radial forces incident on fiber 20 from strand 22 are represented schematically in FIG. 3 by arrows $F_1$, $F_2$ and $F_3$. $F_1$ and $F_2$ represent forces applied by intruder generated vibrations and $F_3$ is the reactive force provided by the support under cable 14. With forces applied to fiber 20 as shown in FIG. 3, a bending stress is developed in the fiber which changes the characteristics of the light transmitted thereby such as polarization of the light as mentioned above. The sensitivity of such a system to vibrations and acoustic or seismic disturbances is extremely high.

Figure 4:
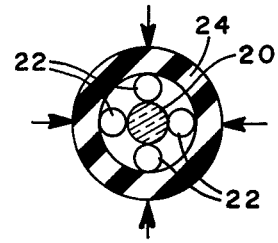
FIGS. 4 and 5 are cross-sectional partially schematic views of the cable assembly showing configurations responsive to applied forces that are omnidirectional and unidirectional, respectively.
Figure 5:
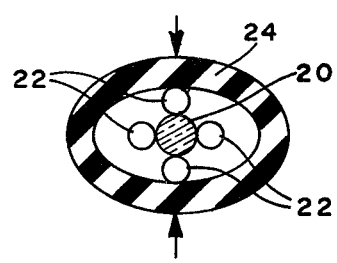

An important feature of this invention is that cable 14 is responsive to omnidirectional or unidirectional radial forces depending upon the shape of sleeve 24. As shown in FIG. 4, sleeve 24 has a circular cross-section and snugly engages the helically wound strand 22 throughout its entire length. Forces applied omnidirectionally to sleeve 24, as indicated by the arrows in FIG. 4, are transmitted thereby via strand 22 to fiber 20 and are detected by detector 15 as described above. Such a sensor is useful for example in the detection of tampering at a larger technical cable bundle in which the sensor cable is implanted. When sleeve 24 is formed with an oblong cross-section as shown in FIG. 5 such that strand 22 is engaged by sleeve 14 only along a longitudinal plane that intersects strand 22 at the minimum transverse dimension of the sleeve, i.e., at the top and bottom as shown in FIG. 5, then only those forces in that plane are transmitted by strand 22 to fiber 20. Those forces are indicated by the arrows in FIG. 5. Forces from other directions are absorbed by sleeve 22 and are not transmitted to fiber 20. Such a unidirectionally responsive cable is useful, for example in a buried line which is to be nonresponsive to surface waves from remote (false alarm) sources.

Since cable 14 is essentially a coaxial assembly, it can readily be fabricated on existing coaxial cable manufacturing machinery with minimum modification and at substantial cost savings. The space between sleeve 24 and fiber 20 may be filled with a compliant dielectric material or simply air. The cable may also be conveniently stored on a reel from which desired lengths may be cut for installation at the operational sites.

What is claimed is:

1. An optical fiber sensor cable responsive to forces applied transversely of the cable for changing the light transmission characteristics of the cable, comprising
   an elongated optical fiber,
   a strand wound around and in engagement with the exterior of said fiber with adjacent coils of the strand axially spaced apart, said strand being characterized by a hardness sufficient to apply a bending stress to said fiber in response to transverse forces applied to said cable, and
   a compliant sleeve covering said strand-wound fiber and engaging said strand only at the intersection of the latter with a longitudinal plane through said fiber whereby only forces in said plane and applied to said sleeve are conducted by said strand to said fiber.

2. A force detection system comprising
   a laser,
   an optical sensor cable connected at one end to said laser for transmitting light therefrom,
   means to apply a transverse force to said cable whereby to change the characteristics of light transmitted by said cable, and
   optical detecting means connected to the other end of said cable and responsive to changes in said light characteristics for indicating the application of said force to said cable,
   said cable comprising an elongated optical fiber,
   a hard strand helically wound about said fiber over the length thereof, and
   a compliant sleeve disposed around and coextensive with said fiber and said strand with the interior of said sleeve engaging only parts of said strand intersected by a single longitudinal plane through said cable whereby said fiber is responsive only to unidirectional radial forces in said plane.

3. The system according to claim 2 in which the cross-sectional shape of said sleeve is oblong, said fiber being responsive only to forces applied to the exterior of said sleeve in the direction of the minimum transverse dimension thereof.

* * * * *